US009939822B2

(12) United States Patent
Lange et al.

(10) Patent No.: US 9,939,822 B2
(45) Date of Patent: Apr. 10, 2018

(54) REMOTE MONITORING FOR FLUID APPLICATOR SYSTEM

(71) Applicant: Graco Minnesota Inc., Minneapolis, MN (US)

(72) Inventors: Christopher M. Lange, Shoreview, MN (US); Nicholas A. Pagano, Blaine, MN (US)

(73) Assignee: Graco Minnesota Inc., Minneapolis, MN (US)

(*) Notice: Subject to any disclaimer, the term of this patent is extended or adjusted under 35 U.S.C. 154(b) by 426 days.

(21) Appl. No.: 14/766,712

(22) PCT Filed: Feb. 11, 2014

(86) PCT No.: PCT/US2014/015698
§ 371 (c)(1),
(2) Date: Aug. 7, 2015

(87) PCT Pub. No.: WO2014/124416
PCT Pub. Date: Aug. 14, 2014

(65) Prior Publication Data
US 2015/0378371 A1 Dec. 31, 2015

Related U.S. Application Data

(60) Provisional application No. 61/763,252, filed on Feb. 11, 2013.

(51) Int. Cl.
G05D 7/00 (2006.01)
G05D 11/00 (2006.01)
(Continued)

(52) U.S. Cl.
CPC ....... *G05D 16/2066* (2013.01); *B05B 7/0408* (2013.01); *B05B 7/166* (2013.01);
(Continued)

(58) Field of Classification Search
CPC .................. G05B 15/02; H04Q 9/00
(Continued)

(56) References Cited

U.S. PATENT DOCUMENTS 8,649,909 B1 * 2/2014 Phillips ............... G05D 7/0676
700/1
2002/0085054 A1 7/2002 Tokie
(Continued)

FOREIGN PATENT DOCUMENTS

JP 2006250049 A 9/2006
KR 101189561 B1 10/2012

OTHER PUBLICATIONS

International Search Report and Written Opinion from PCT Application Serial No. PCT/US2014/015698, dated May 23, 2014, 12 pages.

(Continued)

*Primary Examiner* — Mohammad Ali
*Assistant Examiner* — Md Azad
(74) *Attorney, Agent, or Firm* — Kinney & Lange, P.A.

(57) ABSTRACT

In one embodiment, a remote monitoring system for a fluid applicator system is disclosed. The fluid applicator system is disposed to heat and pump spray fluid, and to transmit reports including sensed temperatures, pressures, and other operational parameters of the fluid applicator system via a wireless network. The remote monitoring system comprises a data storage server, and an end user interface. The data storage server is configured to receive and archive the reports. The end user interface is configured to provide a graphical user interface based on the reports. The graphical user interface illustrates a status of the fluid handling system, sensed and commanded temperatures of the fluid handling (Continued)

system, sensed and commanded pressures of the fluid handling system, and usage statistics of the fluid handling system.

17 Claims, 4 Drawing Sheets

(51) Int. Cl.
    *G05D 16/20* (2006.01)
    *H04Q 9/00* (2006.01)
    *B05B 7/16* (2006.01)
    *B05B 12/00* (2018.01)
    *G05B 15/02* (2006.01)
    *G05D 23/19* (2006.01)
    *B05B 7/04* (2006.01)

(52) U.S. Cl.
    CPC .......... *B05B 7/1613* (2013.01); *B05B 12/006* (2013.01); *G05B 15/02* (2013.01); *G05D 23/1919* (2013.01); *H04Q 9/00* (2013.01)

(58) Field of Classification Search
    USPC .......................................................... 700/282
    See application file for complete search history.

(56) References Cited

U.S. PATENT DOCUMENTS

| | | | |
|---|---|---|---|
| 2004/0124255 A1* | 7/2004 | Heerdt | ................... B05B 12/00 |
| | | | 239/71 |
| 2007/0090132 A1* | 4/2007 | Williams | ........... B65D 83/0005 |
| | | | 222/389 |
| 2008/0311898 A1 | 12/2008 | Benco et al. | |
| 2010/0332149 A1 | 12/2010 | Scholpp | |
| 2012/0156336 A1* | 6/2012 | Hansen | ............... A47J 31/0605 |
| | | | 426/231 |
| 2012/0158336 A1 | 6/2012 | Duchamp et al. | |
| 2012/0163781 A1 | 6/2012 | Sedlacek et al. | |

OTHER PUBLICATIONS

Extended European Search Report for EP Application No. 14749061.9, dated Sep. 14, 2016, 7 pages.

* cited by examiner

Fig. 3

| Name | Device Model | Status | Daily Material Usage | Daily Actual Spray Time | Daily Power On Time | Daily Cycle Count | Cycle Count | Temp A (°F) | Temp B (°F) | Hose (°F) | Pressure A | Pressure B | Last Device Data | Data Location |
|---|---|---|---|---|---|---|---|---|---|---|---|---|---|---|
| − Device 2 | E-XP2i | ○ | 26.5 | 0.7 | 1.1 | 1230 | 30 | 117/32 | 118/32 | 119/32 | 1170/256 | 1175/256 | Feb 4, 2014 1:02:27 PM | J Y E 🔒 |
| Device Serial Number: 3552330531284425<br>Inlet Pressure A/B  89.0/90.0<br>Inlet Temperature A/B  79.0/80.0<br>Device Ambient Temperature: 78.0 @ 2014-02-04 12.57.33 ⊙<br>Last GPS Update:  2014-01-31 01.17.37<br>Device Properties: | | | | | | | | | | | | | | |
| − Device | | ○ | 1902.0 | 13.0 | 13.0 | 31307 | 52568 | 69/70 | 68/70 | 71/70 | 958/·· | 1052/·· | Feb 4, 2014 1:02:20 PM | J Y   🔒 |
| Device Serial Number: 3552330523868931<br>Last GPS Update:  2014-02-04 12.53.59 ⊙<br>Device Properties: | | | | | | | | | | | | | | |
| Spray Rig 1 | E-30 | ● | 5.0 | 1.8 | 5.0 | 177 | 41295 | ··/·· | ··/·· | ··/·· | ··/·· | ··/·· | Feb 4, 2014 4:59:10 AM | J Y   🔒 |
| Spray Rig 2 | E-30 | ○ | 20.0 | 7.5 | 13.0 | 727 | 59851 | 122/128 | 130/125 | 127/120 | 1101/1150 | 1249/1150 | Feb 4, 2014 1:02:05 PM | J Y   🔒 |
| Spray Rig 3 | H-25 | ○ | 21.0 | 3.7 | 9.0 | 349 | 55206 | 124/125 | 126/125 | 127/125 | 1256/·· | 1256/·· | Feb 4, 2014 1:02:02 PM | J Y   🔒 |
| Spray Rig 4 | E-20 | ○ | 5.0 | 4.8 | 9.0 | 469 | 55560 | 109/110 | 112/110 | 111/110 | 1073/1100 | 1170/1100 | Feb 4, 2014 1:02:02 PM | J Y   🔒 |
| Spray Rig 5 | E.XP2 | ● | 6.0 | 3.2 | 7.0 | 297 | 47759 | ··/·· | ··/·· | ··/·· | ··/·· | ··/·· | Feb 4, 2014 6:59:53 AM | J Y   🔒 |

REMOTE MONITORING FOR FLUID APPLICATOR SYSTEM

BACKGROUND

The present invention relates generally to fluid applicator systems, such as those used to apply spray coatings, polyurethane foam, and the like. More particularly, this invention relates to a monitoring system and user interface for remotely gathering and archiving real-time and historical data about a plurality of such fluid applicator systems.

Fluid applicators are used to apply a variety of materials, from hot melt glue to polyurethane coatings. Fluid applicators commonly include both heaters that heat fluids to specified temperatures (e.g. to achieve target viscosities), and motor-driven pumps that pressurize fluids to specified pressures for spraying and/or recirculation. Some fluid applicators, particularly those used to apply polyurea, polyurethane, and similar materials, have separately heated and pumped "A-side" and "B-side" fluid systems that carry different fluids that are only combined when sprayed or otherwise applied. Many fluid applicators have local operator interfaces (LOIs) that provide fluid system operators with substantially real-time readouts of fluid temperatures and pressures, and allow operators to alter target temperatures and pressures by inputting temperature or pressure setpoints.

Fluid applicators are often mobile, and are sometimes installed on wheeled or otherwise mobile platforms or carts that can be pushed or dragged into work locations by hand, as needed. In industrial and construction applications for which multiple fluid applicators may be needed at different, changing, and farflung locations, fluid applicators are often brought to work locations in dedicated vehicles.

SUMMARY

In one embodiment, a remote monitoring system comprises a fluid handling system and a communications module. The fluid handling system comprises a fluid delivery subsystem, at least one pressure sensor, at least one temperature sensor, and a fluid handling system processor. The fluid delivery subsystem is configured to pump and heat a fluid. The temperature and pressure sensors are disposed on the fluid delivery subsystem to sense temperatures and pressures of the fluid, respectively. The fluid handling system processor is configured to produce duty data and commanded pressures and temperatures for the fluid delivery subsystem, and to receive the sensed pressures and temperatures. The communications module is attached to the fluid handling system, and comprises a communications module processor and a transceiver. The communications module processor is configured to retrieve a first data set comprising the duty data, the commanded pressures and temperatures, and the sensed pressures and temperatures, and to produce a second data set that includes the first data set. The transceiver is disposed to transmit the second data set via a communication network to an end user-accessible data storage server.

In another embodiment, a remote monitoring system for a fluid applicator system is disclosed. The fluid applicator system is disposed to heat and pump spray fluid, and to transmit reports including sensed temperatures, pressures, and other operational parameters of the fluid applicator system via a wireless network. The remote monitoring system comprises a data storage server, and an end user interface. The data storage server is configured to receive and archive the reports. The end user interface is configured to provide a graphical user interface based on the reports. The graphical user interface illustrates a status of the fluid handling system, sensed and commanded temperatures of the fluid handling system, sensed and commanded pressures of the fluid handling system, and usage statistics of the fluid handling system.

BRIEF DESCRIPTION OF THE DRAWINGS

FIG. 3 is an illustrative view of a graphical user interface for an end user interface of the remote monitoring system.

DETAILED DESCRIPTION

Figure 1:
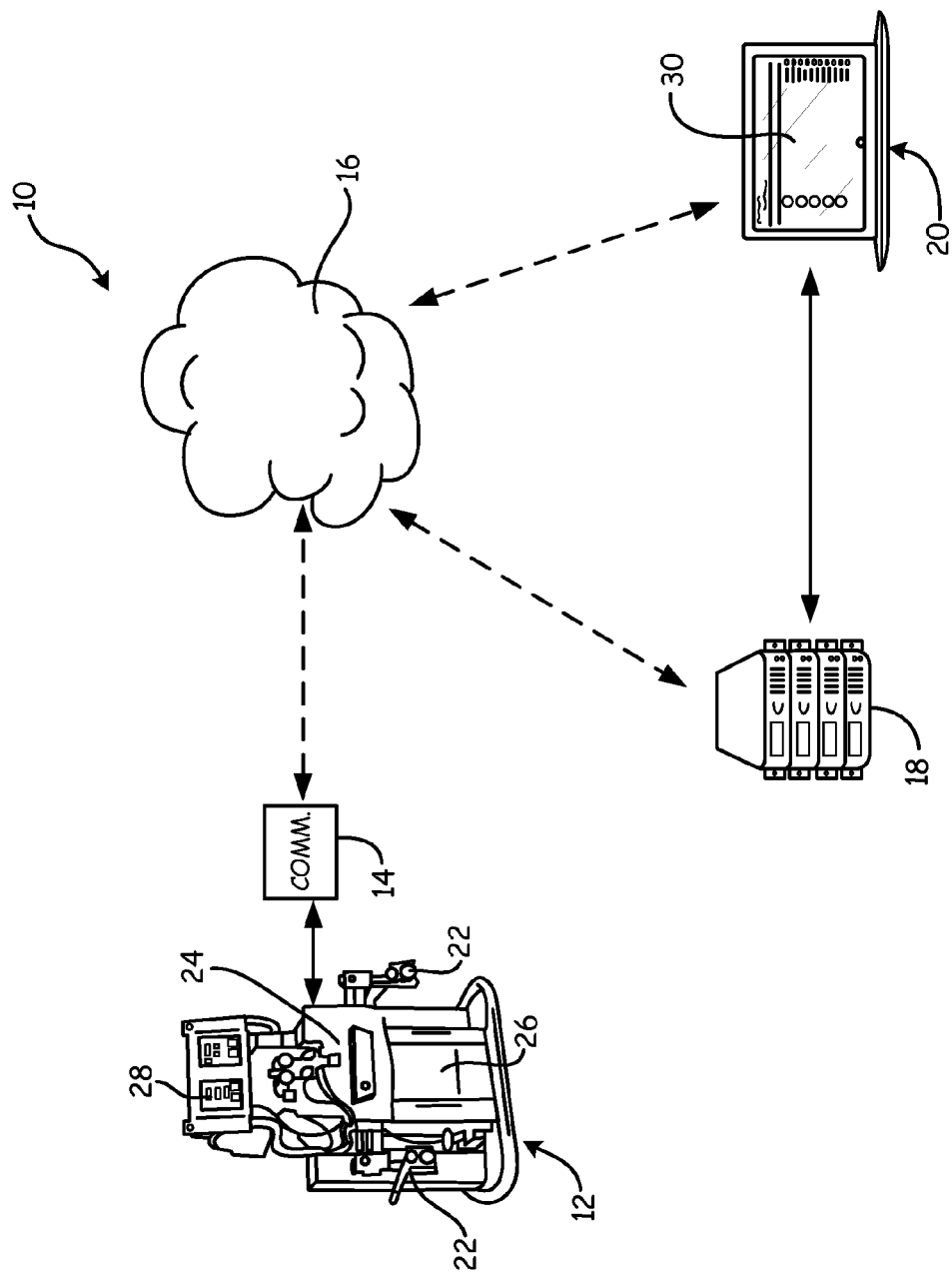
FIG. 1 is a pictorial schematic diagram of an embodiment of a remote monitoring system for a fluid handling system.

FIG. 1 is a pictorial schematic diagram illustrating one embodiment of remote monitoring system 10, which comprises fluid handling system 12, communications module 14, communications network 16, data storage server 18, and end user interface (EUI) 20. The illustrated embodiment is shown merely by way of example, and not limitation.

Fluid handling system 12 is a fluid system such as a polyurethane sprayer or hot melt sprayer. Fluid handling system 12 comprises fluid hookups 22, pump module 24, heater module 26, and local operator interface (LOI) 28, as well as further logic components described below, with respect to FIG. 2. Pump module 24 is disposed to draw fluid from reservoirs (not shown) attached to fluid hookups 22, and to pressurize fluid to desired setpoint pressures. Pump module 24 can, for example, comprise a motorized pump or set of pumps driven by one or more electric, hydraulic, or pneumatic motors. Heater module 26 is configured to heat fluid pressurized by pump module 24 to desired setpoint temperatures. Heater module 26 can, for example, comprise a fluid channel or set of channels outfitted with electrically resistive or chemical heating elements. Pump module 24 and heater module 26 together make up a fluid delivery subsystem that brings fluids to specified pressures and temperatures (and thereby viscosities) suitable for spraying or other application to a work surface. In the illustrated embodiment, fluid handling system 12 is a two-side fluid system with A- and B-sides dedicated to different fluids that are mixed only when sprayed. In other embodiments, however, fluid handling system 12 can comprise any number of separate fluid lines, or a single fluid line. During use, fluid from heater module 26 and pump module 24 can, by way of example, be pumped through a hose or pipe to a sprayer or applicator (not shown).

LOI 28 is an interface device that enables a local operator to read off substantially real-time sensed values of fluid temperature and pressure, and specify setpoint temperatures and pressures to act as commanded values governing the operation of pump module 24 and heater module 26. Where pump module 24 and heater module 26 comprise multiple isolated fluid lines for separate fluids, LOI 28 allows users to select different commanded temperatures and pressures for each fluid line.

Communications module 14 is a remote communication device attached to fluid handling system 12. Fluid handling system 12 and communications module 14 together comprise a fluid applicator system that can be transported (e.g. via truck, or by cart) to an appropriate work location. Although communications module 14 is depicted as a separate device connected to fluid handling system 12, communications module 14 can be either a separate device affixed to fluid handling system 12, or an integrated component of fluid handling system 12, as desired for particular applications. Communications module 14 retrieves operating parameter data from fluid handling system 12, gathers additional location-specific data, and transmits reports including both of these data sets, as described in greater detail below with respect to FIGS. 2 and 4. Communication module 14 allows local information about the fluid applicator system, and particularly about fluid handling system 12, to be accessed, aggregated, and archived at remote locations.

Communications module 14 transmits reports (either periodically, or on demand) through communications network 16 to data storage server 18 via communications network 16. In some embodiments, communications module 14 regularly assembles and transmits reports based at least in part on a pre-set schedule. In further embodiments, communications module 14 can transmit reports based on the content of process data received from fluid handling system 12, e.g. conditionally transmitting some reports in the event of unexpected sensor readings or event/error codes. Communications network 16 is illustrated as a cloud, but can be any data distribution network. In particular, communications network 16 can include a cellular or other wireless network, either a dedicated network purposed specifically for use with remote monitoring system 10, or a general purpose network shared with other applications. Data storage server 18 can, for example, be a single storage device or storage stack, or an array of distributed devices.

Data storage server 18 archives reports from communications module 14, either indefinitely or for a predetermined time (e.g. for the last week, or the last six months), so that history data is accessible at EUI 20. EUI 20 can be dedicated hardware terminal designed for use with remote monitoring system 10, a general purpose computing device with suitable memory and processor capabilities running application software specific to remote monitoring system 10, or a general purpose computing device such as a personal computer or cellular device capable of running a general purpose web browser that accesses information archived at data storage server 18. EUI 20 can, for example, be a personal computer or a wireless tablet or cellular device running an appropriate task-specific software application. EUI 20 has graphical user interface (GUI) 30, which provides end users with a range of aggregated, historical, and real-time data about fluid handling system 12, as described in greater detail below. Although GUI 30 is displayed on EUI 20, the information displayed in GUI 30 can be assembled (i.e. by aggregating operational parameter data form reports, producing metadata, and calculating secondary quantities from reported data) either at data storage server 18, or at EUI 20. In many embodiments, data storage server 18 and EUI 20 can communicate via communication network 16 with a plurality of communications modules 14 attached to fluid handling systems 12. In this way, EUI 20 enables end users to remotely access aggregated, historical, and real-time data about multiple, geographically distributed fluid handling devices.

Figure 2:
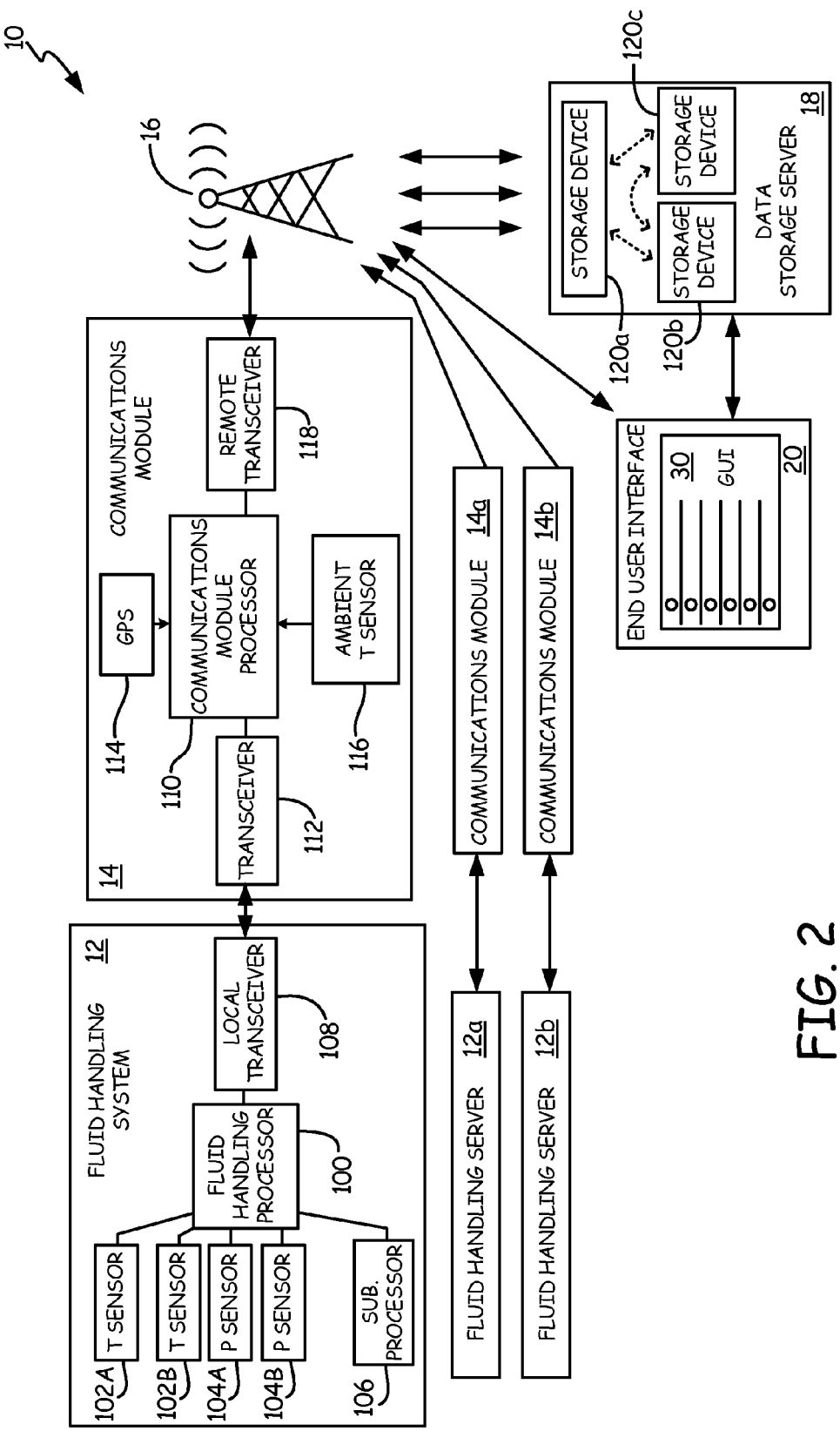
FIG. 2 is a schematic block diagram of an embodiment of a communication network of the remote monitoring system of FIG. 1.

FIG. 2 is a schematic block diagram illustrating logic components of remote monitoring system 10. As described above, remote monitoring system 10 comprises fluid handling system 12, communications module 14, communications network 16, data storage server 18, and EUI 20. As illustrated in FIG. 2, remote monitoring system 10 further comprises additional fluid handling systems 12a and 12b connected to additional communications modules 14a and 14b, respectively. Fluid handling systems 12a and 12b can, for example, be additional identical or similar fluid handling systems to fluid handling system 12. Fluid handling systems 12a and 12b may differ from each other and from fluid handling system 12 in specifics of form and function, but are generally fluid handling systems as described above with respect to FIG. 1. In general, remote monitoring system 10 can include any number of fluid handling systems with corresponding communications modules.

In addition to heating and pressurizing fluid (see FIG. 1), fluid handling system 12 collects, receives, and produces data regarding a range of operational parameters, including actual and commanded temperatures and pressures, error or event codes and states, and "duty data" such as device on-time, hours of use, pump cycle counts and other duty cycle data. In the illustrated embodiment, fluid handling system 12 comprises temperature sensors 102a and 102b, pressure sensors 104a and 104b, subsidiary processor 106, fluid handling processor 100, and local transceiver 108. Temperature sensors 102a and 102b can, for instance, be thermocouples, resistive temperature detectors, bimetallic sensors, or other temperature sensors selected for suitability for the operating conditions of fluid handling system 12. Temperature sensors 102a and 102b can, for example, be disposed at inlet and/or outlet locations of fluid handling system 12 and/or heater module 26. Pressure sensors 104a and 104b can, for example, be piezoelectric or capacitive pressure sensors disposed at inlet and/or outlet locations of fluid handling system 12 and/or pump module 24. Although only two temperature sensors 102a and 102b and two pressures sensors 104a and 104b are shown in FIG. 2, fluid handling system 12 can comprise any number of pressure and temperatures sensors. In particular, embodiments of fluid handling system 12 with separate A-side and B-side fluid lines can incorporate separate sets of temperature and pressure sensors for each fluid line.

Fluid handling processor 100 and sub-processor 106 are logic-capable devices that receive, retrieve, and/or produce operational parameters of fluid handling system 12. Although fluid handling processor 100 is depicted as a single element, some embodiments of fluid handling processor 100 can constitute a plurality of separate logic processors, each separately in communication with appropriate sensors and with local transducer 108. In one such embodiment, fluid handling processor 100 comprises a motor controller processor dedicated to pump motors of pump module 24, and a heater controller processor dedicated to heater module 26. Some embodiments of fluid handling system 12 may include sub-processor 106, an additional logic-capable processor that communicates with local transducer 108 only via fluid handling processor 100. For example, fluid handling processor 100 may comprise a motor controller processor that, in addition to receiving sensor data and commanded setpoint pressures related to pump operation, receives and aggregates signals from a heater controller processor.

Fluid handling processor 100 (and, in some embodiments, sub-processor 106) receives user inputs specifying setpoint temperatures and pressures for fluid handling system 12. These setpoint temperatures and pressures act as commanded or target values towards which heater module 26 and pump module 24 respectively operate. Fluid handling 100 also generates and/or gathers (e.g. from sub-processor 106) error and event codes corresponding to events such as malfunctions, overheating events, pump jams, and the like, and counts pump cycles of pump(s) in pump module 24. In some embodiments, fluid handling processor 100 displays some or all of this operational data on LOI 28, and receives inputs (including temperature and pressures setpoints) from LOI 28. Fluid handling processor 100 transmits some or all of this operational data to local transceiver 108, which transmits the operational data to communications module 14. Local transceiver 108 can transmit operational data periodically, continuously, on demand, or as retrieved/produced by fluid handling processor 100. This operational data can further include software version numbers or codes identifying versions of software currently used by fluid handling processor 100, sub processor 106, and the like.

Communications module 14 is a device attached to, integrated into, or otherwise commonly situated with fluid handling system 12. Communications module 14 comprises communications module processor 110, local transceiver 112, Global Positioning System (GPS) module 114, ambient temperature sensor 116, and remote transducer 118. In some embodiments, communications module 14 may be a modular add-on component to fluid module 12. In other embodiments, communications module 14 may be an internal component inside the same housing or structure as fluid handling system 12. In the depicted embodiment, communications module processor 110 receives operational data from fluid handling processor 100 via local transceivers 108 and 112. For embodiments in which communications module 14 is integrated into fluid handling system 12, transceivers 108 and 112 may be unnecessary.

GPS module 114 is a global positioning device capable of receiving GPS signals, and thence determining the location of communications module 14 (and thereby fluid handling system 12). GPS module 114 can be a GPS transceiver disposed to communicate with GPS satellites and transmit GPS signals to communication module processor 110 for processing, or a logic-capable GPS transceiver-processor that itself determines the location of communications module 14 from received GPS signals. Although communications module 14 is illustrated with GPS module 114, other location finding systems such as cellular triangulation may equivalently be used. GPS module 114 provides communications module 110 with either processed location data (e.g. latitude and longitude), or with unprocessed location data (e.g. satellite signals used by communications module 110 to determine latitude and longitude).

Ambient temperature sensor 116 is a temperature sensor disposed to sense environmental temperatures at or near communications module 14 and fluid handling system 12. Extreme temperatures can adversely affect the viscosity, composition, and degradation of fluids processed by fluid handling system 12. Ambient temperature sensor 116 provides a measurement of environmental temperatures that can be used to assess the risk of such adverse temperature reactions.

Communications module processor 110 retrieves operational parameters from fluid handling processor 100 as described above, GPS location information from GPS module 114, and sensed environmental temperatures from ambient temperature sensor 116. Communications module processor 110 aggregates these data to form a data report that includes both operational parameter information (e.g. commanded and sensed temperatures and pressures, pump cycle counts, software version numbers) and location information (e.g. location coordinates based on the GPS location information and a temperature at the location from the sensed environmental temperature). This data report is transmitted to data storage server 18 via communication network 16 by remote transceiver 118. Remote transceiver 118 can, for instance, be a cellular or other wireless transceiver capable of transmitting and receiving signals to and from remote locations. Communications module processor 110 can assemble and transmit data reports periodically, continuously or semi-continuously, or on-demand in response to user requests or fluid handling system events (e.g. errors or alerts generated by fluid handling processor 100).

Data storage server 18 receives data reports from communications module 14, and parallel, similar reports from any additional communications modules 14a and 14b. Additional communications modules 14a and 14b can collect different data set from fluid handling systems 12a and 12b, respectively, and may accordingly transmit reports that differ from the data reports generated by communications module 14.

Data storage server 18 is a persistent data storage medium that can further include a logic-capable processor. In the depicted embodiment, data storage server 18 comprises a plurality of interconnected storage devices 120a, 120b, and 120c. Storage devices 120a, 120b, and 120c can, for example, be separate drives arranged in a redundant array and/or distributed storage devices situated in disparate locations. More generally, data storage server 18 may comprise any number of data storage devices, including only a single data storage device. Data storage server 18 receives data reports from all communication modules (14, 14a, 14b, etc.) in remote monitoring system 10, and archives both operational parameter information and location information for each fluid handling system (12, 12a, 12b, etc.) in remote monitoring system 10.

EUI 20 acts as a terminal by which a human operator can access information stored in data storage server 18 using GUI 30. Although only one EUI 20 is shown in FIG. 2, some embodiments of remote monitoring system 10 may allow a greater number, or any number, of EUIs 20. GUI 30 provides users with a range of aggregated, historical, and real-time data about multiple fluid handling systems, accessible from the single location of EUI 20, which may be remote from any fluid handling systems. For example, an employee of a company or project employing many fluid handling systems (e.g. 12, 12a, and 12b) at various locations monitor all of these devices from EUI 20. Moreover, because data storage server 18 archives the contents of data reports from each fluid handling system 12, 12a, 12b for an extended period, EUI 20 enables users to access and compare historical data including historical sensed and commanded temperatures and pressures, software version histories, pump cycle counts, error and event log histories, and past device locations/movement. Software version numbers and histories can be used to identify reading discrepancies between different machines due to differences in software version. Data storage server 18 can selectively purge some or all of this information periodically, e.g. automatically deleting data older than a threshold period. EUI 20 may communicate with data storage device server 18 either directly, or via communication network 16.

EUI 20 and data storage server 18 cooperate to provide users with real-time (or substantially real-time) data and historical data, as well as data derived from real-time and/or historical data. These derived data can be produced at EUI 20 using archived data retrieved from data storage server 18, or locally at data storage server 18, e.g. on demand from EUI 20. Derived data available via GUI 30 at EUI 20 can include pumped fluid volumes (per hour, per day, etc.) derived from pump cycle counts and pumping volumes known for each model and application of fluid handling system 12. Derived data can also include alerts or alarms generated whenever particular event or error codes are received, and/or whenever operating parameters deviate sufficiently from expected values. For example, EUI 20 and/or data storage server 18 can automatically generate alerts whenever sensed pressures exceed commanded values by more than a threshold amount, or whenever sensed temperatures deviate from commanded values by more than a threshold amount for a sufficient time. EUI 20 allows users to access a wide range of data pertaining to multiple fluid applicator systems from a remote location, using GUI 30.

FIG. 3 is an illustrative view of one embodiment of GUI 30. As shown in FIG. 3, GUI 30 includes information screen 200 with a plurality of rows 202 (including rows 202a and 202b) with header row 204, and columns 206-232 corresponding to particular parameters. Each row 202 corresponds to an individual fluid applicator system comprising a fluid handling system (e.g. 12, 12a, 12b) and a communications device (e.g. 14, 14a, 14b), with column entries for that row representing operational parameter data, location data, or derived data for that fluid applicator system. Although only one information screen 200 is shown, some embodiments of GUI 30 can include multiple information screens 200 that can be displayed simultaneously, or which users can page between to access information, e.g., pertaining to different projects or different fluid applicator system types. Each information screen 200 can be scrollable and/or resizable to change the range and/or scale of rows and columns shown.

As depicted in FIG. 3, information screen 200 includes device model column 206, device status column 208, daily material usage column 210, daily actual spray time column 212, daily power on time column 214, daily cycle count column 216, resettable cycle count column 218, A-side temperature column 220, B-side temperature column 222, hose temperature column 224, A-side pressure column 226, B-side pressure column 228, last device data column 230, and data/location column 232. These columns represent one embodiment of information screen 200; in other embodiments, additional or fewer parameters can be displayed. In some embodiments, the columns displayed on information screen 200 can be configurable by end users.

In the depicted embodiment, device model column 206 displays the particular make or model of each fluid applicator system represented in rows 202. EUI 20 and/or data storage server 18 can associate each make or model with particular fluid tasks, and/or with known pump displacement values. Status column 208 provides indicators of device status for each fluid applicator system in the form of a colored icon or graphic. Status column 208 can, for instance, show a green circle for a presently active (i.e. heating and/or pumping) fluid applicator system, a yellow circle for an applicator system that was recently active, and a red circle for an applicator for a system that has not been active for some time (e.g. >10 minutes). In some embodiments, status column 208 can include color or text indicators of alarm conditions or urgent events. In alternative embodiments, other types of indicators may be used. Daily material usage column 210 represents fluid volume pumped by each fluid applicator system, as calculated from cycle counts and known pump displacement volumes for each device model. Daily actual spray time column 212, daily power on time column 214, and daily cycle count column 216 represent corresponding duty parameters determined from archived process parameter data included in the data reports, and resettable cycle count column 218 represents a count of pump cycles since manually reset by a user at EUI 20 or LOI 28. These daily value columns correspond to aggregated historical values based on archived data reports across an extended time period. Although these columns are shown and described herein as fields corresponding to daily values, other time periods can be used as appropriate to each application, e.g. hourly, weekly, monthly, etc.

A-side temperature column 220, B-side temperature column 222, hose temperature column 224, A-side pressure column 226, and B-side pressure column 228 represent temperatures and pressures taken from the most recent data reports from each fluid applicator system. A-side and B-side temperature columns 220 and 222 can, for example, represent inlet or outlet fluid temperatures at respective sides of each fluid applicator system, while hose temperature column 224 can represent temperatures at the hose-end spray/application location of each fluid applicator system. Last device data column 230 indicates the last time at which a data report was received from each fluid applicator system.

Data and location column 232 provides a plurality of additional data buttons, including job log button 234, daily usage log button 236, event log button 238, and location button 240. Each button calls up additional detailed historical data when clicked, e.g. in a popup or drop-down window. Job log button 234 calls up a history of temperatures, pressures, cycle counts, and other operational parameters from data storage server 18. Daily usage button 236 calls up a history by day (in the exemplary embodiment) of usage statistics, e.g. corresponding to columns 210, 212, 214, and 216. Event log button 238 calls up a history of event and/or error codes. Location button 240 calls up a history of locations based on GPS location data, indicating where a fluid applicator system has been, and when it has moved. The historical data accessed via buttons 234, 236, 238, and 240 can span the full archived history available from data storage server 18, or only recent events (e.g. the last month, year, etc.).

Each row 202 further includes an expand/contract button 242 that expands that row to display additional details 244 (see rows 202a and 202b). Additional details 244 may, for example, include device address information, ambient temperature, and last update times for particular information, e.g. GPS location, ambient temperature, and/or inlet temperatures. Additional details 244 include data retrieved and archived in data storage server 18 but not otherwise shown in columns 206-232.

GUI 30 enables users to assess the current status and historical performance of multiple devices at a glance, from a remote central location. GUI 30 may, in some embodiments, be customizable to allow each user to immediately view the information most relevant to his or her own task. In an exemplary embodiment, GUI 30 may be customizable to hide or show particular fields by clicking an icon or graphic such as button 242. In further or alternative embodiments, GUI 30 may be customizable to hide or show particular fields by editing a configuration file.

Figure 4:
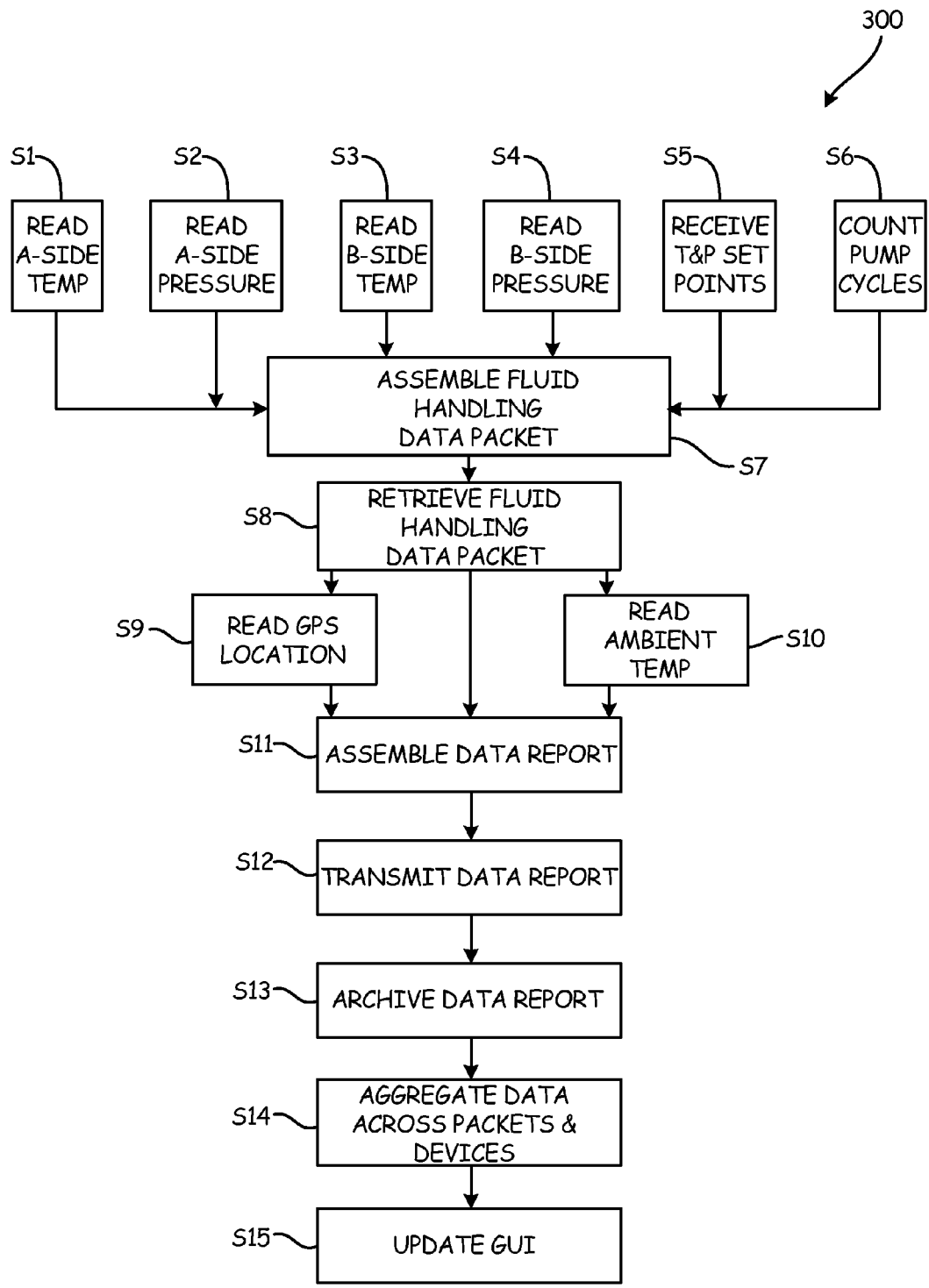
FIG. 4 is a method flowchart illustrating one embodiment of a method of operation of the remote monitoring system of FIGS. 1 and 2.

FIG. 4 is a method flowchart of method 300, an illustrative embodiment of one method of operating remote monitoring system 10. Although method 300 illustrates steps performed in one illustrative order, alternative embodiments of the present invention may perform steps of method 300 in different orders, without departure from the present invention.

First, fluid handling system processor 100 retrieves or produces a variety of parameters, as described above. In the depicted embodiment, fluid handling system processor 100 reads an A-side temperature from temperature sensor 102a (Step S1), an A-side pressure from pressure sensor 104a (Step S2), a B-side temperature from temperature sensor 102*b* (Step S3), and a B-side pressure from pressure sensor 104*b* (Step S4), either directly or via a subsidiary processor such as sub-processor 106. Fluid handling system processor 100 receives temperature and pressure set points corresponding to A-side and B-side commanded temperatures and pressures (Step S5), and pump cycle counts (Step S6). All of these operational parameters are assembled into a fluid handling data packet (Step S7) that is retrieved by communications module processor 110 via local transceivers 108 and 112. (Step S8). The fluid handling data packet can additionally contain other information, as described above with respect to FIG. 2, such as error and/or event codes, and software versions.

Communications module processor 110 reads a GPS location from GPS module 114 (Step S9), reads an environmental temperature from ambient temperature sensor 116 (Step S10), and assembles a data report comprising a composite data packet including the contents of the fluid handling data packet, the GPS location, and the environmental temperature (Step S11). In some cases or embodiments, communications module processor 110 may assemble some data reports without the GPS location and/or the environmental temperature, providing this information less frequently, or on demand. Communications module processor 110 transmits the data report through communications network 16 via remote transceiver 118 to data storage server 18, (Step S12) where all of the contained data is archived (Step S13). EUI 20 and/or data storage server 18 aggregates data across multiple packets from disparate devices, assembling historical and derived data. (Step S14). GUI 30 of EUI 20 is then updated with this information. (Step S15). Method 300 repeats at each iteration of data collection, for each fluid applicator system, although some data collection steps of method 300 may be skipped in some iterations (e.g. reading GPS locations). Method 300 may automatically repeat at fixed intervals and/or on demand.

Method 300 ensures that GUI 30 provides users with substantially up-to-date information about a plurality of fluid applicator systems. This information includes not only real-time or quasi-real-time operational parameter data such as commanded and actual temperature and pressure readings, but also historical data including usage statistics for the past days or months of operation, and derived data such as material usage statistics.

Discussion of Possible Embodiments

The following are non-exclusive descriptions of possible embodiments of the present invention.

A remote monitoring system comprises a fluid handling system and a communications module. The fluid handling system comprises: a fluid delivery subsystem configured to pump and heat a fluid; at least one temperature sensor disposed on the fluid delivery subsystem to sense temperatures of the fluid; at least one pressure sensor disposed on the fluid delivery subsystem to sense pressures of the fluid; and a fluid handling system processor configured to produce duty data and commanded pressures and temperatures for the fluid delivery subsystem, and configured to receive the sensed pressures and temperatures. The communications module is attached to the fluid handling system, and comprises: a communications module processor configured to retrieve a first data set comprising the duty data, the commanded pressures and temperatures, and the sensed pressures and temperatures, and to produce a second data set that includes the first data set; and a transceiver disposed to transmit the second data set via a communication network to an end user-accessible data storage server.

The remote monitoring system of the preceding paragraph can optionally include, additionally and/or alternatively, any one or more of the following features, configurations and/or additional components:

A further embodiment of the foregoing remote monitoring system, wherein the communications module further comprises: a global positioning system (GPS) unit configured to identify a location of the communications module, and thereby the fluid handling system; and wherein the second data set further comprises the location of the communications module.

A further embodiment of the foregoing remote monitoring system, wherein the communications module further comprises: an ambient temperature sensor configured to sense an environmental temperature at the communications module; and wherein the second data set further comprises the sensed environmental temperature.

A further embodiment of the foregoing remote monitoring system, wherein the duty data includes a pump cycle count, and wherein the second data set comprises a pumped volume determined from the pump cycle count.

A further embodiment of the foregoing remote monitoring system, wherein the commanded pressures and temperatures are pressure and temperature setpoints of the fluid delivery subsystem, and wherein the fluid handling processor controls the fluid handling subsystem according to the pressure and temperature setpoints.

A further embodiment of the foregoing remote monitoring system, wherein the fluid handling processor comprises a motor controller processor unit and a heater controller processor unit.

A further embodiment of the foregoing remote monitoring system, wherein the at least one temperature sensor comprises a temperature sensor disposed at a fluid inlet of the fluid handling system, and a temperature sensor disposed at a fluid outlet of the fluid handling system.

A further embodiment of the foregoing remote monitoring system, wherein the second data set further comprises event codes indicating events and errors experienced by the fluid handling system and/or the communications module.

A further embodiment of the foregoing remote monitoring system, wherein the transceiver transmits the second data set wirelessly via a cellular network.

A further embodiment of the foregoing remote monitoring system, wherein the fluid handling system is a dual fluid system with an A-side fluid system comprising an A-side pump and an A-side heater, and a B-side fluid system comprising a B-side pump and a B-side heater.

A further embodiment of the foregoing remote monitoring system, wherein the sensed temperatures, sensed pressures, commanded temperatures, and commanded pressures comprise temperatures and temperatures of both the A-side fluid system and the B-side fluid system.

A remote monitoring system for a fluid applicator system disposed to heat and pump spray fluid, and to transmit reports via a network, the remote monitoring system comprising a data storage server and an end user interface. The data storage server is configured to retrieve and archive the reports, including sensed temperatures and pressures of the fluid applicator system. The end user interface is configured to provide a graphical user interface based on the reports, the graphical user interface outputting: a status of the fluid handling system; sensed and commanded temperatures of the fluid handling system; sensed and commanded pressures of the fluid handling system; and usage statistics of the fluid handling system.

A remote monitoring system for a fluid applicator system disposed to heat and pump spray fluid, and to transmit reports including sensed temperatures, pressures, and other operational parameters of the fluid applicator system via a wireless network, the remote monitoring system comprising a data storage server and an end user interface configured to provide a graphical user interface based on the reports. The data storage server is configured to retrieve and archive the reports. The graphical user interface illustrates: a status of the fluid handling system; sensed and commanded temperatures of the fluid handling system; sensed and commanded pressures of the fluid handling system; and usage statistics of the fluid handling system.

The remote monitoring system of the preceding paragraph can optionally include, additionally and/or alternatively, any one or more of the following features, configurations and/or additional components:

A further embodiment of the foregoing remote monitoring system, wherein the sensed temperatures included in the reports comprise inlet and outlet fluid temperatures of the fluid applicator system.

A further embodiment of the foregoing remote monitoring system, wherein the sensed pressures included in the reports comprise inlet and outlet pressures of the fluid handling system.

A further embodiment of the foregoing remote monitoring system, wherein the fluid applicator system comprises a pump and a heater, and wherein the other operational parameters included commanded pressures and commanded temperatures of the pump and the heater, respectively.

A further embodiment of the foregoing remote monitoring system, wherein the fluid applicator system is a dual fluid system with an A-side fluid system comprising an A-side pump and an A-side heater, and a B-side fluid system comprising a B-side pump and a B-side heater.

A further embodiment of the foregoing remote monitoring system, wherein the other operational parameters include usage statistics comprising fluid handling system on-time, pumping time, and pumped volume based on pump duty cycles.

A further embodiment of the foregoing remote monitoring system, wherein the graphical user interface provides a history of temperatures, pressures, and usage statistics from the archived reports.

A further embodiment of the foregoing remote monitoring system, wherein the graphical user interface provides a history of event logs indicating error and event codes reflecting events experienced by the fluid applicator system.

A further embodiment of the foregoing remote monitoring system, wherein the graphical user interface provides location information indicating a location of the fluid handling system, based on global positioning system data.

Although the present invention has been described with reference to preferred embodiments, workers skilled in the art will recognize that changes may be made in form and detail without departing from the spirit and scope of the invention.

The invention claimed is:
1. A remote monitoring system comprises:
a fluid handling system comprising:
a fluid delivery subsystem configured to pump and heat a fluid;
at least one temperature sensor disposed on the fluid delivery subsystem to sense temperatures of the fluid;
at least one pressure sensor disposed on the fluid delivery subsystem to sense pressures of the fluid; and
a fluid handling system processor configured to produce duty data and commanded pressures and temperatures for the fluid delivery subsystem, and configured to receive the sensed pressures and temperatures,
wherein the fluid handling system is a dual fluid system with an A-side fluid system comprising an A-side pump and an A-side heater, and a B-side fluid system comprising a B-side pump and a B-side heater, and further wherein the sensed temperatures, sensed pressures, commanded temperatures, and commanded pressures comprise temperatures and pressures of both the A-side fluid system and the B-side fluid system;
a communications module attached to the fluid handling system, the communications module comprising:
a communications module processor configured to retrieve a first data set comprising the duty data, the commanded pressures and temperatures, and the sensed pressures and temperatures, and to produce a second data set that includes the first data set; and
a transceiver disposed to transmit the second data set via a communication network to an end user-accessible data storage server.

2. The remote monitoring system of claim 1, wherein the communications module further comprises:
a global positioning system (GPS) unit configured to identify a location of the communications module, and thereby the fluid handling system; and
wherein the second data set further comprises the location of the communications module.

3. The remote monitoring system of claim 1, wherein the communications module further comprises:
an ambient temperature sensor configured to sense an environmental temperature at the communications module; and
wherein the second data set further comprises the sensed environmental temperature.

4. The remote monitoring system of claim 1, wherein the duty data includes a pump cycle count.

5. The remote monitoring system of claim 1, wherein the fluid handling processor controls the fluid handling subsystem according to the commanded pressures and temperatures.

6. The remote monitoring system of claim 1, wherein the fluid handling processor comprises a motor controller processor unit and a heater controller processor unit.

7. The remote monitoring system of claim 1, wherein the at least one temperature sensor comprises a temperature sensor disposed at a fluid inlet of the fluid handling system, and a temperature sensor disposed at a fluid outlet of the fluid handling system.

8. The remote monitoring system of claim 1, wherein the second data set further comprises event codes indicating events and errors experienced by the fluid handling system and/or the communications module.

9. The remote monitoring system of claim 1, wherein the transceiver transmits the second data set wirelessly via a cellular network.

10. A remote monitoring system for a fluid applicator system disposed to heat and pump spray fluid, and to transmit reports via a network, wherein the fluid applicator system is a dual fluid system with an A-side fluid system comprising an A-side pump and an A-side heater, and a B-side fluid system comprising a B-side pump and a B-side heater, the remote monitoring system comprising:

a data storage server configured to retrieve and archive the reports, including sensed temperatures and pressures of the fluid applicator system; and an end user interface configured to provide a graphical user interface based on the reports, the graphical user interface outputting:

a status of the fluid handling system;

sensed and commanded temperatures of the fluid handling system;

sensed and commanded pressures of the fluid handling system; and usage statistics of the fluid handling system, wherein the other operational parameters included commanded pressures and commanded temperatures of the A- and B-side pumps, and the A- and B-side heaters, respectively.

11. The remote monitoring system of claim 10, wherein the sensed temperatures included in the reports comprise inlet and outlet fluid temperatures of the fluid applicator system.

12. The remote monitoring system of claim 10, wherein the sensed pressures included in the reports comprise inlet and outlet pressures of the fluid handling system.

13. The remote monitoring system of claim 10, wherein the other operational parameters include usage statistics comprising fluid handling system on-time, pumping time, and pumped volume based on pump duty cycles.

14. The remote monitoring system of claim 10, wherein the graphical user interface provides a history of temperatures, pressures, and usage statistics from the archived reports.

15. The remote monitoring system of claim 10, wherein the graphical user interface provides a history of event logs indicating error and event codes reflecting events experienced by the fluid applicator system.

16. The remote monitoring system of claim 10, wherein the graphical user interface provides location information indicating a location of the fluid handling system, based on global positioning system data.

17. A remote monitoring system for use with a fluid applicator system configured to pump two or more fluids, the fluid applicator system including an A-side fluid system with a A-side pump and A-side heater, and a B-side fluid system with a B-side pump and a B-side heater, the remote monitoring system comprising:

a communications module in communication with the fluid applicator system, the communications module including a communications module processor configured to retrieve a first data set comprising commanded pressures and temperatures of the A- and B-side pumps and heaters, respectively, and sensed pressures and temperatures of the A- and B-side pumps and heaters, respectively, and further configured to produce a second data set and transmit the second data set from a transceiver via a communication network to an end user interface; and an end user interface disposed to provide a graphical user interface for displaying the second data set, wherein the end user interface receives the second data set sent by the transceiver.

\* \* \* \* \*